United States Patent
Hong et al.

(10) Patent No.: US 9,970,118 B2
(45) Date of Patent: May 15, 2018

(54) METHOD FOR PREPARING FUEL ELECTRODE OF SOLID OXIDE ELECTROLYSIS CELLS EMBEDDED WITH BIMETALLIC CATALYST

(71) Applicant: KOREA INSTITUTE OF SCIENCE AND TECHNOLOGY, Seoul (KR)

(72) Inventors: Jong Sup Hong, Seoul (KR); Si Won Kim, Seoul (KR); Man Soo Park, Seoul (KR); Hyoung Chul Kim, Seoul (KR); Kyung Joong Yoon, Seoul (KR); Ji Won Son, Seoul (KR); Jong Ho Lee, Seoul (KR); Hae Weon Lee, Seoul (KR); Byung Kook Kim, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 0 days. days.

(21) Appl. No.: 15/390,462

(22) Filed: Dec. 23, 2016

(65) Prior Publication Data

US 2018/0066371 A1    Mar. 8, 2018

(51) Int. Cl.
| | |
|---|---|
| *H01M 4/04* | (2006.01) |
| *C25B 11/04* | (2006.01) |
| *B05D 1/30* | (2006.01) |
| *B05D 3/10* | (2006.01) |
| *B05D 3/04* | (2006.01) |
| *B41F 15/08* | (2006.01) |

(Continued)

(52) U.S. Cl.
CPC ............ *C25B 11/0478* (2013.01); *B05D 1/30* (2013.01); *B05D 3/0453* (2013.01); *B05D 3/108* (2013.01); *B41F 15/08* (2013.01); *H01M 4/04* (2013.01); *H01M 4/8605* (2013.01); *H01M 4/885* (2013.01); *H01M 4/8846* (2013.01); *H01M 4/9025* (2013.01)

(58) Field of Classification Search
USPC .......................................... 427/115
See application file for complete search history.

(56) References Cited

U.S. PATENT DOCUMENTS

| | | | | |
|---|---|---|---|---|
| 3,198,667 | A | * | 8/1965 | Gladrow ............... H01M 4/96 427/115 |
| 2009/0061279 | A1 | * | 3/2009 | Larsen .............. H01M 4/9033 429/410 |

(Continued)

FOREIGN PATENT DOCUMENTS

| | | | |
|---|---|---|---|
| FR | 1556571 | * | 2/1969 |
| KR | 10-2009-0061870 A | | 6/2009 |

OTHER PUBLICATIONS

Liu et al, Highly Stable and Efficient Catalyst with In Situ Exsolved Fe—Ni Alloy Nanospheres Socketed on an Oxygen Deficient Perovskite for Direct CO2 Electrolysis, ACS Catalysis, Aug. 9, 2016, pp. 6219-6228, ACS Catal. 2016, vol. 6.

(Continued)

*Primary Examiner* — Brian K Talbot
(74) *Attorney, Agent, or Firm* — Goldilocks Zone IP Law (57) ABSTRACT

A method for uniformly forming a nickel-metal alloy catalyst in a fuel electrode of a solid oxide electrolysis cell is provided.
Specifically, before the nickel-metal alloy catalyst is formed, a metal oxide is uniformly distributed on nickel oxide contained in the fuel electrode through infiltration of a metal oxide precursor solution and hydrolysis of urea.

8 Claims, 10 Drawing Sheets

(51) Int. Cl.
*H01M 4/88* (2006.01)
*H01M 4/86* (2006.01)
*H01M 4/90* (2006.01)

(56) References Cited

U.S. PATENT DOCUMENTS

2009/0061284 A1* 3/2009 Blennow ............... C04B 35/47
  429/466
2016/0172683 A1* 6/2016 Sabolsky ............ H01M 4/8846
  429/523

OTHER PUBLICATIONS

Kim et al., Reactions and mass transport in high temperature co-electrolysis of steam/CO2 mixtures for syngas production, Journal of Power Sources, Jan. 20, 2015, pp. 630-639, vol. 280.

* cited by examiner

METHOD FOR PREPARING FUEL ELECTRODE OF SOLID OXIDE ELECTROLYSIS CELLS EMBEDDED WITH BIMETALLIC CATALYST

CROSS-REFERENCE TO RELATED APPLICATIONS

This application claims, under 35 U.S.C. § 119, the priority of Korean Patent Application No. 10-2016-0114726, filed on Sep. 7, 2016, in the Korean Intellectual Property Office, the disclosure of which is incorporated herein by reference in its entirety.

DESCRIPTION ABOUT NATIONAL RESEARCH AND DEVELOPMENT SUPPORT

This work was supported by the New & Renewable Energy Core Technology Program of the Korea Institute of Energy Technology Evaluation and Planning (KETEP) granted financial resource from the Ministry of Trade, Industry & Energy, Republic of Korea (No. 20143030031430).

BACKGROUND (a) Technical Field

The present invention relates to a method for uniformly forming an alloy catalyst in a fuel electrode of a solid oxide electrolysis cell.

(b) Background Art

Recently, with rapid climate change and global warming, technologies capable of reducing the emission of the greenhouse gas, carbon dioxide, or utilizing the same are drawing attention. Although carbon dioxide capture and storage is the representative technology of reducing the emission of carbon dioxide, the capture and storage technology is limited in treatment capacity. Therefore, technologies of converting and utilizing carbon dioxide are drawing particular attention recently.

A representative example of carbon dioxide conversion is reverse water gas shift (RWGS). Through the reverse water gas shift reaction, carbon monoxide (CO) can be selectively produced from carbon dioxide ($CO_2$) and hydrogen ($H_2$). The produced carbon monoxide (CO) can be used as a fuel or as a raw material for the production of high value-added plastics.

The reverse water gas shift reaction can be achieved with high efficiency through high-temperature co-electrolysis of carbon dioxide and water ($H_2O$), which leads to production of a synthesis gas (syngas) containing hydrogen. Because the process proceeds at high temperatures, it is outstandingly advantageous over other production technologies in terms of thermodynamics and kinetics. In addition, the production amount and selectivity of the product can be controlled by controlling the conversion rate of the reactant. Furthermore, the synthesis gas consisting primarily of carbon monoxide and hydrogen can be converted to high value-added chemicals, synthetic liquid fuels, etc. through follow-up processes.

Accordingly, high-temperature co-electrolysis technologies using solid oxide electrolysis cells are drawing a lot of interests recently. The solid oxide electrolysis cell is generally operated at high temperatures (700-1,000° C.). It is structurally safe because all structural components are in solid state and is suitable for high-temperature co-electrolysis because it is operable even when exposed to a hydrocarbon gas environment.

The existing solid oxide cell containing a nickel (Ni)-based fuel electrode as disclosed in Korean Patent Publication No. 10-2009-0061870 exhibits good catalytic activity and electrical conductivity for fuel oxidation, but improvement is necessary because it exhibits low conversion rate when reducing chemically stable carbon dioxide.

Although a method of using a nano-sized noble metal catalyst has been proposed to improve the carbon dioxide conversion catalytic activity of the solid oxide electrolysis cell, there are limitations due to high sintering temperature during the preparation of the solid oxide cell, high cost because of the use of a large amount of the noble metal catalyst, etc.

REFERENCES OF THE RELATED ART

Patent Documents (Patent document 1) Korean Patent Publication No. 10-2009-0061870.

SUMMARY

The present invention has been made to solve the above-described problems.

The present invention is also directed to providing a method for preparing a solid oxide electrolysis cell which exhibits superior carbon dioxide conversion rate, synthesis gas production, selectivity, etc. and is suitable for high-temperature co-electrolysis.

The present invention is also directed to providing a method for uniformly supporting an alloy catalyst on a fuel electrode of a solid oxide electrolysis cell.

The present invention is also directed to providing a method for uniformly forming an alloy catalyst on a fuel electrode of a solid oxide electrolysis cell even when a metal catalyst is added in a small amount.

Other features and aspects of the present invention will be apparent from the following detailed description, drawings and claims.

A method for preparing an alloy catalyst-supported fuel electrode of a solid oxide electrolysis cell according to the present invention may include (1) a step of preparing a solid oxide electrolysis cell wherein a nickel oxide (NiO)-containing fuel electrode, an electrolyte and an air electrode are stacked, (2) a step of forming a nano-sized metal oxide on the nickel oxide contained in the fuel electrode and (3) a step of forming a nickel-metal alloy catalyst by reducing the nickel oxide and the metal oxide.

In a specific exemplary embodiment of the present invention, the step (2) may include (2-1) a step of mixing a metal oxide precursor, urea and a solvent, (2-2) a step of infiltrating the mixture solution obtained in the step (2-1) into the fuel electrode, (2-3) a step of forming a metal hydroxide or a metal hydroxycarbonate on the surface of the nickel oxide by heat-treating the fuel electrode that has passed through the step (2-2) and (2-4) a step of removing the solvent and forming a metal oxide on the surface of the nickel oxide by heat-treating the fuel electrode that has passed through the step (2-3).

In a specific exemplary embodiment of the present invention, the step (2-3) may be performed at 80-100° C. for 2-4 hours.

In a specific exemplary embodiment of the present invention, the step (2-4) may be performed at 250-400° C. for 1-2 hours.

In a specific exemplary embodiment of the present invention, in the step (2-1), the metal oxide precursor and the urea may be mixed at a molar ratio of 1:10 to 1:6.

In a specific exemplary embodiment of the present invention, in the step (2-1), the solvent is a mixture of ethanol and water at a volume ratio of 1:1.7 to 1:0.6 and the mixture may be used as the solvent.

In a specific exemplary embodiment of the present invention, the steps (2-2) through (2-4) may be repeated such that the content of the metal oxide becomes 0.25-1.25 mg/cm$^2$.

In a specific exemplary embodiment of the present invention, in the step (3), the fuel electrode that has passed through the step (2) may be heat-treated at 600-900° C. under a hydrogen atmosphere.

In a specific exemplary embodiment of the present invention, the metal of the nickel-metal alloy catalyst may be one or more of platinum (Pt), palladium (Pd), ruthenium (Ru), rhodium (Rh), iron (Fe), copper (Cu) and cobalt (Co).

The present invention provides the following advantageous effects.

According to the present invention, a solid oxide electrolysis cell suitable for high-temperature co-electrolysis can be prepared.

According to the present invention, aggregation and deterioration of the metal (noble metal) due to high sintering temperature can be prevented because the solid oxide electrolysis cell is prepared and then the alloy catalyst is formed by introducing the metal oxide precursor.

According to the present invention, the alloy catalyst can be formed uniformly even when the metal (noble metal) is used in a small amount because the nano-sized metal oxide is uniformly distributed on the fuel electrode and then the alloy catalyst is formed by reducing the metal oxide. Accordingly, it is very advantageous in ensuring cost competitiveness.

The advantages effects of the present invention are not limited to those mentioned above. It is to be understood that the effects of the present invention include all effects that can be inferred from the following description.

BRIEF DESCRIPTION OF DRAWINGS

The patent or application file contains at least one drawing executed in color. Copies of this patent or patent application publication with color drawings will be provided by the Office upon request and payment of the necessary fee.

DETAILED DESCRIPTION

Hereinafter, the present invention is described in detail through exemplary embodiments. The exemplary embodiments of the present invention can be modified in various forms within the scope of the present invention. However, the scope of the present invention is not limited by the exemplary embodiments.

In the present specification, detail description of well-known features and functions will be omitted to avoid unnecessary obscurity.

In the present specification, unless specified otherwise, "include or contain" means that there may be another component.

Figure 1:
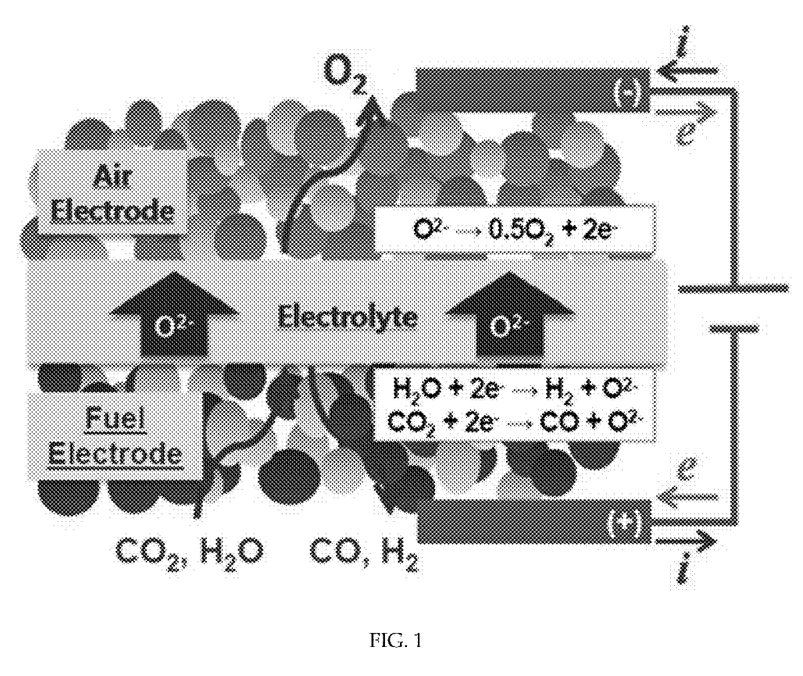
FIG. 1 describes high-temperature co-electrolysis using a solid oxide electrolysis cell.

FIG. 1 describes high-temperature co-electrolysis using a solid oxide electrolysis cell.

The solid oxide electrolysis cell is composed of a porous fuel electrode, a dense electrolyte and a porous air electrode.

Carbon dioxide ($CO_2$) and water ($H_2O$) are supplied to the fuel electrode and electrolyzed to produce carbon monoxide (CO) and hydrogen ($H_2$) as described in the following reaction formula. During the procedure, oxygen ion ($O^{2-}$) is transferred to the air electrode through the electrolyte and oxygen ($O_2$) is produced and released at the air electrode.

Electrolysis of Carbon Dioxide $CO_2(g)+2e^-\rightarrow CO(g)+O^{2-}$  [Reaction Formula 1]

Electrolysis of Water (Steam)

$H_2O(g)+2e^-\rightarrow H_2(g)+O^{2-}$  [Reaction Formula 2]

Carbon dioxide conversion (reverse water gas shift; RWGS) may occur through high-temperature co-electrolysis of carbon dioxide and water using the solid oxide electrolysis cell.

Reverse Water Gas Shift $CO_2(g)+H_2(g)\rightarrow CO(g)+H_2O(g)$  [Reaction Formula 3]

However, with the existing solid oxide electrolysis cell, wherein nickel (Ni) is used alone as a catalyst of a fuel electrode, it is difficult to reduce the chemically stable carbon dioxide.

In order to overcome this limitation, the present invention provides a method for uniformly forming a nickel-metal alloy catalyst which exhibits structurally and chemically higher catalytic activity than the single metal catalyst even when a smaller amount of metal is used.

The present invention provides a method for preparing an alloy catalyst-supported fuel electrode of a solid oxide electrolysis cell, which includes: (1) a step of preparing a solid oxide electrolysis cell wherein a nickel oxide (NiO)-containing fuel electrode, an electrolyte and an air electrode are stacked, (2) a step of forming a nano-sized metal oxide on the nickel oxide contained in the fuel electrode and (3) a step of forming a nickel-metal alloy catalyst by reducing the nickel oxide and the metal oxide.

In the present invention, the metal of the nickel-metal alloy catalyst may be one or more of platinum (Pt), palladium (Pd), ruthenium (Ru), rhodium (Rh), iron (Fe), copper (Cu) and cobalt (Co). Accordingly, the metal oxide or a metal oxide precursor which will be described below means an oxide or an oxide precursor containing such a metal.

In the present invention, the solid oxide electrolysis cell consisting of the fuel electrode, the electrolyte and the air electrode is prepared before forming the alloy catalyst on the fuel electrode.

In order to increase carbon dioxide conversion rate, etc., it is preferred to use a noble metal, a transition metal, etc. as a metal to form the alloy catalyst with nickel. However, because the solid oxide electrolysis cell is prepared by stacking the fuel electrode, the electrolyte, the air electrode, etc. and then sintering at very high temperature, problems such as aggregation, deterioration, etc. may occur if the metal is supported on the fuel electrode in advance.

Accordingly, in the present invention, the solid oxide electrolysis cell wherein the nickel oxide (NiO)-containing fuel electrode, the electrolyte and the air electrode are stacked is prepared first and then the metal oxide is formed on the nickel oxide contained in the fuel electrode to avoid the above problems.

The solid oxide electrolysis cell may be prepared according to a known method.

The fuel electrode is prepared such that it contains nickel oxide (NiO) as nickel is a constituent element of the alloy catalyst. Specifically, the fuel electrode may be prepared by mixing nickel oxide (NiO), yttria-stabilized zirconia (yttria-stabilized $ZrO_2$; YSZ) and a solvent, preparing the resulting mixture solution into a powder through spray drying, and compressing the powder or making the powder into a slurry and then tape casting the same. Subsequently, the solid oxide electrolysis cell may be prepared by stacking the electrolyte, the air electrode, etc. on the fuel electrode.

In the step (2), the metal oxide is formed on the nickel oxide contained in the fuel electrode.

Specifically, the metal oxide may be formed through (2-1) a step of mixing a metal oxide precursor, urea and a solvent, (2-2) a step of infiltrating the mixture solution obtained in the step (2-1) into the fuel electrode, (2-3) a step of forming a metal hydroxide or a metal hydroxycarbonate on the surface of the nickel oxide by heat-treating the fuel electrode that has passed through the step (2-2) and (2-4) a step of removing the solvent and forming a metal oxide on the surface of the nickel oxide by heat-treating the fuel electrode that has passed through the step (2-3).

In the present invention, before the nickel-metal alloy catalyst is formed, the metal oxide is distributed uniformly on the nickel oxide contained in the fuel electrode through infiltration of the metal oxide precursor solution and hydrolysis of the urea.

A method for forming a nano-sized catalyst by infiltrating a precursor solution into a porous structure is widely known. However, for a solid oxide electrolysis cell, it is difficult to uniformly distribute the catalyst through simple solution infiltration because the fuel electrode is thick and not highly porous. In addition, there may be a region where the catalyst is not formed at all because the solution cannot infiltrate deeply.

Therefore, in the present invention, in order to uniformly form the metal oxide on the nickel oxide contained in the fuel electrode, the mixture solution to which the metal oxide precursor and the urea are added is prepared and infiltrated into the fuel electrode and then the fuel electrode is heat-treated under a specific condition.

In general, when forming a nano-sized catalyst from a precursor solution, a ligand inducing precipitation of the catalyst is added to the precursor solution.

In the present invention, instead of adding a ligand to the mixture solution containing the metal oxide precursor, the urea is added and hydrolyzed by heating to a specific temperature. The urea is degraded slowly into ammonia and carbon dioxide at about 80° C. and a ligand ($OH^-$, $CO_3^{2-}$, etc.) is produced during this process.

That is to say, in the present invention, the ligand is not added at once to the precursor solution but it is formed continuously by adding the urea and hydrolyzing the same. As the ligand is provided continuously to the metal oxide precursor, the metal oxide can be precipitated uniformly and can be distributed uniformly on the nickel oxide contained in the fuel electrode unlike a case where ligand is added at once.

For the continuous provision of the ligand through the hydrolysis of the urea, the following conditions may be satisfied.

Specifically, in the step (2-1), the metal oxide precursor and the urea may be mixed at a molar ratio of 1:10 to 1:6. When the molar ratio is too low, the amount of the ligand provided through the hydrolysis of the urea may not be enough. And, when the molar ratio is too high, the precipitation of the metal oxide may be interrupted.

Specifically, in the step (2-3), the fuel electrode may be heat-treated at 80-100° C. for 2-4 hours. Under this condition, the urea may be degraded slowly at a suitable rate.

In the present invention, a mixture solvent of water and ethanol is used as the solvent of the mixture solution containing the metal oxide precursor, so that the mixture solution can infiltrate more deeply into the fuel electrode.

Because ethanol has lower surface tension than water, the mixture solution can infiltrate more deeply into the fuel electrode when the mixture solvent of water and ethanol is used as compared to when water is used as the solvent.

Specifically, in the step (2-1), the solvent is a mixture of ethanol with water at a volume ratio of 1:1.7 to 1:0.6 and the mixture may be used as the solvent.

The solvent is removed in the step (2-4) as the fuel electrode is heat-treated at 250-400° C. for 1-2 hours.

Specifically, the steps (2-2) through (2-4) may be repeated such that the content of the metal oxide formed on the nickel oxide in the step (2) becomes 0.25-1.25 mg/cm². When the content of the metal oxide is less than 0.25 mg/cm², the metal-nickel alloy catalyst may not be formed uniformly with a uniform distribution. And, when it exceeds 1.25 mg/cm², the catalytic activity may not be improved enough as compared to the amount of the metal used, which is economically unfavorable.

In the step (3), the nickel-metal alloy catalyst is formed by reducing the nickel oxide and the metal oxide.

Because the metal oxide is uniformly distributed on the nickel oxide with a nano size through the step (2), the nickel-metal alloy catalyst may be formed as the nickel oxide and the metal oxide are reduced.

The reduction of the nickel oxide and the metal oxide may be performed by heat-treating the fuel electrode at 600-900° C. under a hydrogen atmosphere.

EXAMPLES

The present invention will be described in more detail through examples. The following examples are for illustrative purposes only and it will be apparent to those skilled in the art that the scope of this invention is not limited by the examples.

Example 1

(1) Preparation of Solid Oxide Electrolysis Cell

Figure 2:
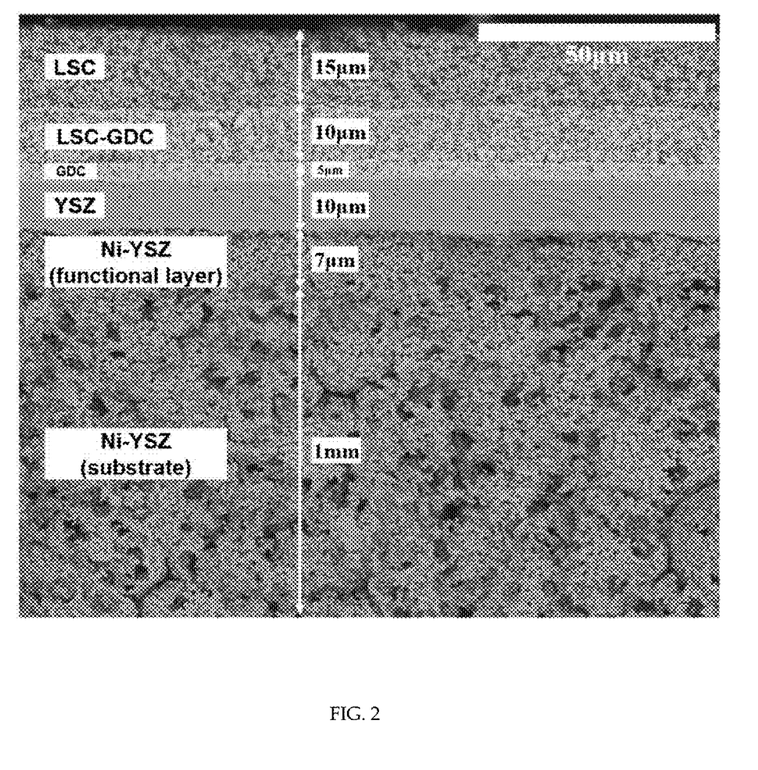
FIG. 2 shows the cross-section of a solid oxide electrolysis cell prepared in Example 1.

FIG. 2 shows the cross-section of a solid oxide electrolysis cell prepared in Example 1. Referring to the figure, the solid oxide electrolysis cell has a structure wherein a fuel electrode substrate (Ni-YSZ), a fuel electrode functional layer (Ni-YSZ), electrolyte (YSZ), an interdiffusion barrier layer (GDC), an air electrode functional layer (LSC-GDC) and an air electrode current collecting layer (LSC) are stacked in sequence.

A nickel-metal alloy catalyst according to the present invention may be formed on the fuel electrode substrate wholly or partly, although not being limited thereto.

Because the present invention relates to a method for forming an alloy catalyst on the fuel electrode of the solid oxide electrolysis cell, Example 1 will be described focusing on the preparation of the fuel electrode.

1) Preparation of Fuel Electrode Substrate

Nickel oxide (NiO, Sumitomo Metal Mining, Japan), yttria-stabilized zirconia (8 mol % $Y_2O_3$-stabilized $ZrO_2$, Tosoh Corp., Japan) and poly(methyl methacrylate) (PMMA) were mixed at a volume ratio of 0.37:0.33:0.3. Ethanol was used as a solvent and a dispersant, a binder and a plasticizer were further added.

The obtained mixture solution was pulverized using a ball mill for about 24 hours and then spray-dried into a powder.

A fuel electrode substrate was formed by applying a pressure of about 60 MPa to the powder.

2) Preparation of Fuel Electrode Functional Layer

A mixture solution was prepared as described above without using PMMA. The prepared mixture solution was pulverized using a planetary mill and a fuel electrode functional layer was formed on the fuel electrode substrate through screen printing using the same.

3) Preparation of Electrolyte and Air Electrode

As in the formation of the fuel electrode functional layer, a solid oxide electrolysis cell as shown in FIG. 2 was prepared by stacking the electrolyte and the air electrode through screen printing. The materials used to form the electrolyte and the air electrode are identical or similar to existing ones and detailed description thereof will be omitted.

After forming the electrolyte formed of YSZ on the fuel electrode functional layer, sintering was performed at about 1,400° C.

After forming an interdiffusion barrier layer formed of GDC (gadolinium-doped ceria) on the electrolyte, sintering was performed at about 1,250° C.

After forming an air electrode functional layer formed of LSC (lanthanum-strontium-cobalt-ferrite)-GDC on the interdiffusion barrier layer and forming an air electrode current collecting layer formed of LSC on the air electrode functional layer, sintering was performed at about 950° C.

The prepared solid oxide electrolysis cell was in the form of a 2 cm×2 cm unit cell.

(2) Formation of Nano-sized Metal Oxide

1) Preparation of Mixture Solution

A palladium (Pd) oxide precursor was used as a metal oxide precursor. Specifically, a 0.3 mol/L tetraamminepalladium(II) nitrate solution ($Pd(NH_3)_4(NO_3)_2$ (Sigma-Aldrich, USA) was used.

A mixture solution was prepared by mixing the palladium oxide precursor and urea (Sigma-Aldrich, USA) in a mixture solvent of water and ethanol. A molar ratio of the palladium oxide precursor and the urea was 1:10 and a volume ratio of ethanol to water was 1:1.7.

2) Infiltration of Mixture Solution

The mixture solution was infiltrated into the fuel electrode (precisely the fuel electrode substrate) of the solid oxide electrolysis cell by quantitatively dropping thereon.

3) Heat Treatment

The mixture solution-infiltrated solid oxide electrolysis cell was dried in an oven at about 80° C. for about 2 hours (first heat treatment) and then heat-treated at about 400° C. for about 1 hour.

The amount of formed palladium oxide (PdO) was compared before and after the infiltration. The infiltration and heat treatment were repeated until the amount of the palladium oxide was about 0.25 $mg/cm^2$. The amount of the palladium oxide became about 0.25 $mg/cm^2$ when the procedure was repeated 8 times in Example 1.

Figure 3A:
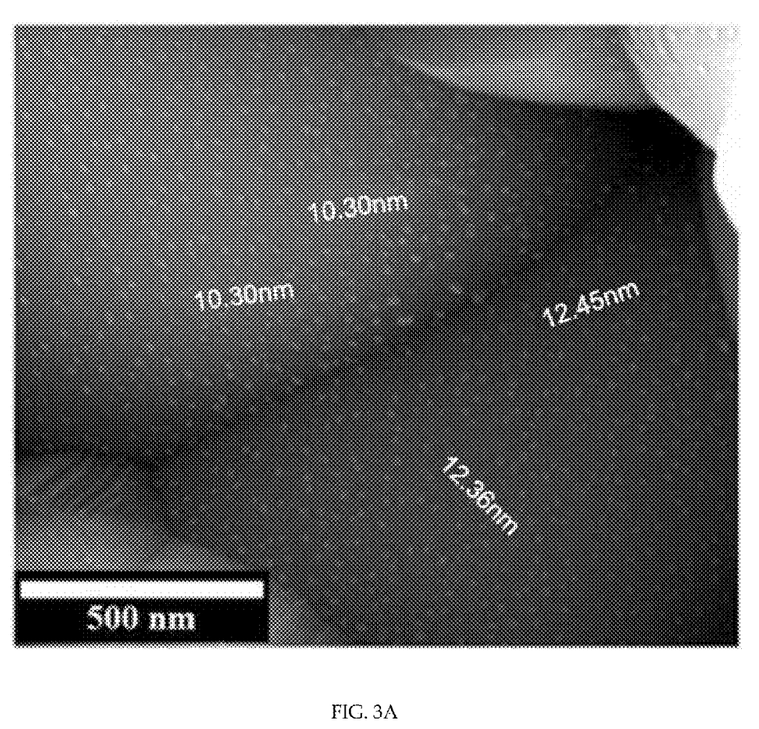
FIG. 3A shows the analysis results of SEM (scanning electron microscope) for a fuel electrode of a solid oxide electrolysis cell after (2) step is finished in Example 1.
Figure 3B:
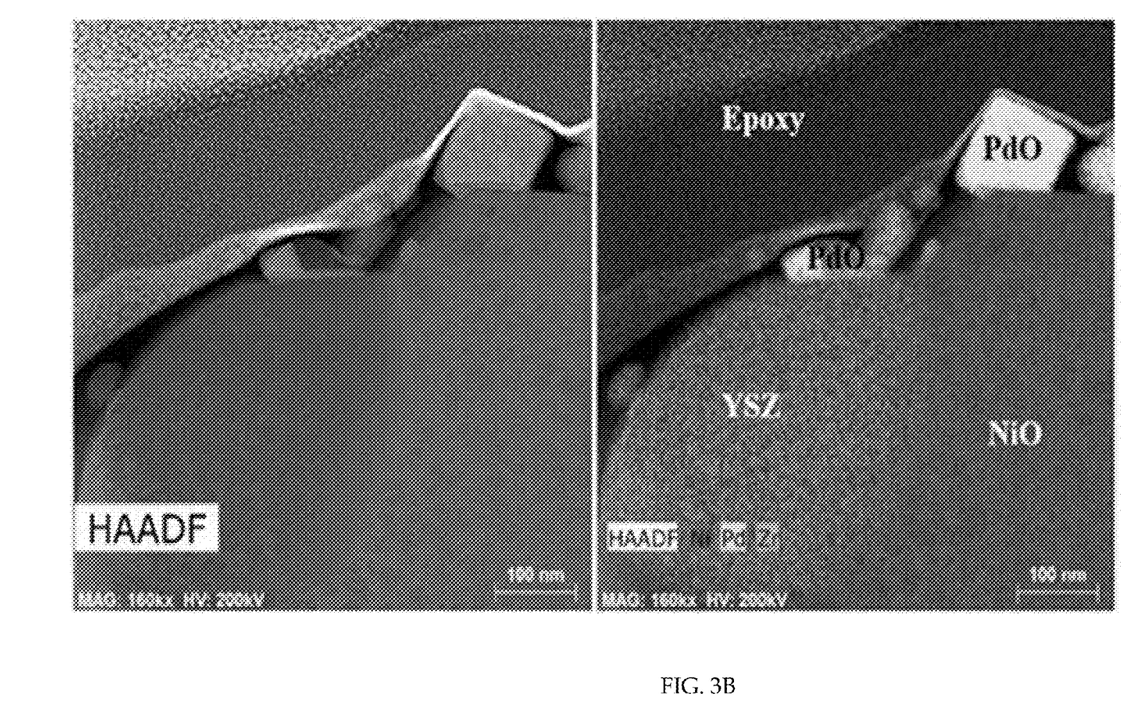
FIG. 3B shows the analysis results of TEM (transcmission electron microscope) for a fuel electrode of a solid oxide electrolysis cell after (2) step is finished in Example 1.

FIG. 3 shows scanning electron microscopic (SEM) and transmission electron microscopic (TEM) analysis results of the fuel electrode of the solid oxide electrolysis cell prepared as described above.

Referring to FIG. 3 (*a*), it can be seen that palladium oxide (PdO) is very uniformly distributed on the surface of the fuel electrode with a size of about 10 nm.

And, referring to FIG. 3 (*b*), it can be seen that the palladium oxide (PdO) is formed on the surface of the nickel oxide (NiO) contained in the fuel electrode.

(3) Formation of Nickel-palladium Alloy Catalyst

After the palladium oxide has been formed, a nickel-palladium alloy catalyst was formed by reducing the nickel oxide and the palladium oxide by heat-treating the solid oxide electrolysis cell at about 800° C. under a 10% hydrogen atmosphere.

Figure 4:
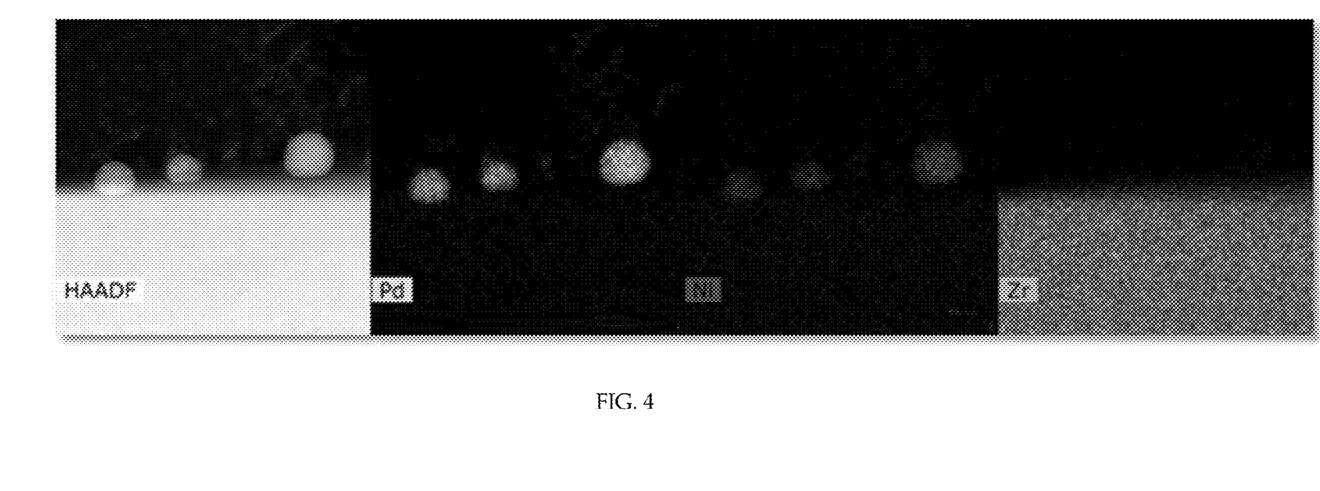
FIG. 4 shows the analysis results of TEM (transcmission electron microscope) for a fuel electrode of a solid oxide electrolysis cell after (3) step is finished in Example 1.

FIG. 4 shows a transmission electron microscopic (TEM) analysis result of the fuel electrode of the solid oxide electrolysis cell prepared as described above. Referring to the figure, it can be seen that a nickel-palladium alloy catalyst was formed as the palladium oxide was reduced to palladium and the nickel oxide was reduced to nickel.

Example 2

A solid oxide electrolysis cell fuel electrode was prepared in the same manner as in Example 1, except that the infiltration and heat treatment were repeated until the amount of the palladium oxide was about 0.75 $mg/cm^2$ in the step (2).

Example 3

A solid oxide electrolysis cell fuel electrode was prepared in the same manner as in Example 1, except that the infiltration and heat treatment were repeated until the amount of the palladium oxide was about 1.25 $mg/cm^2$ in the step (2).

Comparative Example

The solid oxide electrolysis cell obtained in the step (1) of Example 1, i.e., the solid oxide electrolysis cell containing nickel only, was used.

Test Example 1

Carbon dioxide conversion rate ($CO_2$ conversion), the composition of a produced gas and the change in cell voltage were measured while supplying carbon dioxide and steam (1:1, 1:3) as fuel at 800° C. to the solid oxide electrolysis cells according to Example 1 and Comparative Example.

Figure 5:
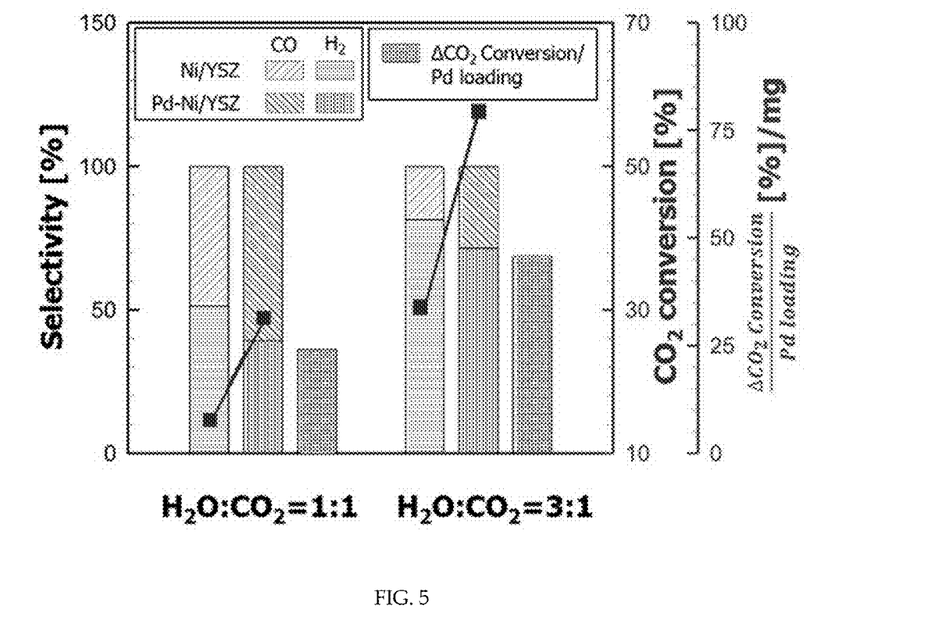
FIG. 5 shows a result of measuring the carbon dioxide conversion rate and the composition of a produced gas in Example 1 and Comparative Example.

FIG. 5 shows a result of measuring the carbon dioxide conversion rate and the composition of a produced gas. From the figure, it can be seen that Example 1 shows higher carbon dioxide conversion rate and better selectivity for carbon monoxide (CO selectivity) as compared to Comparative Example under all conditions.

Figure 6:
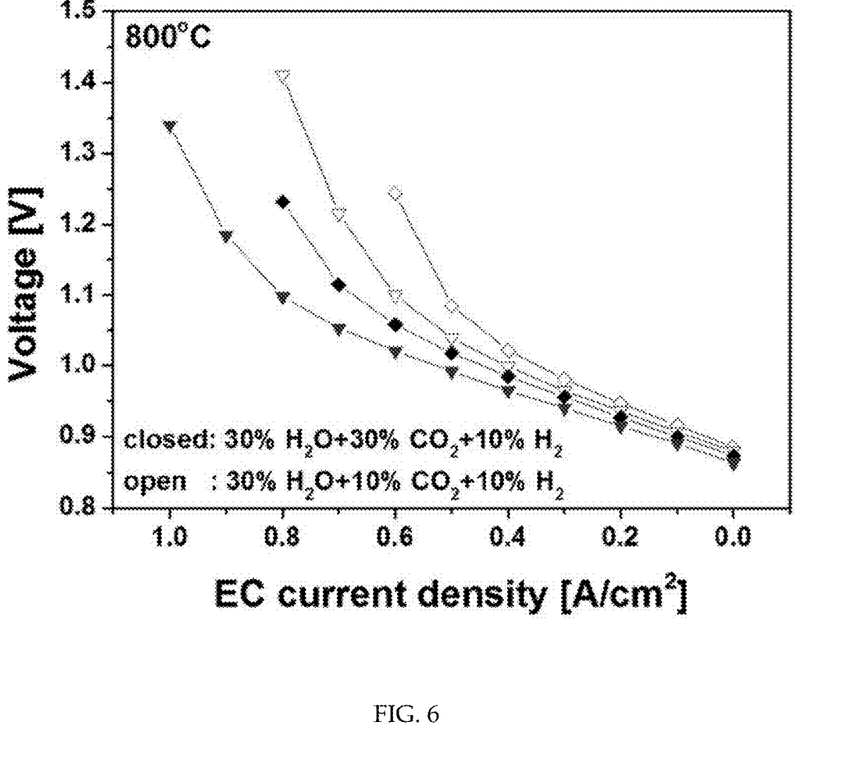
FIG. 6 shows a result of measuring the current-voltage behavior of solid oxide electrolysis cells according to Example 1 and Comparative Example.

FIG. 6 shows a result of measuring the current-voltage behavior of the solid oxide electrolysis cells. From the figure, it can be seen that Example 1 shows lower cell resistance at constant voltage (V) as compared to Comparative Example because it operates with higher current. That is to say, Example 1 exhibits better cell behavior than Comparative Example.

Test Example 2

Figure 7:
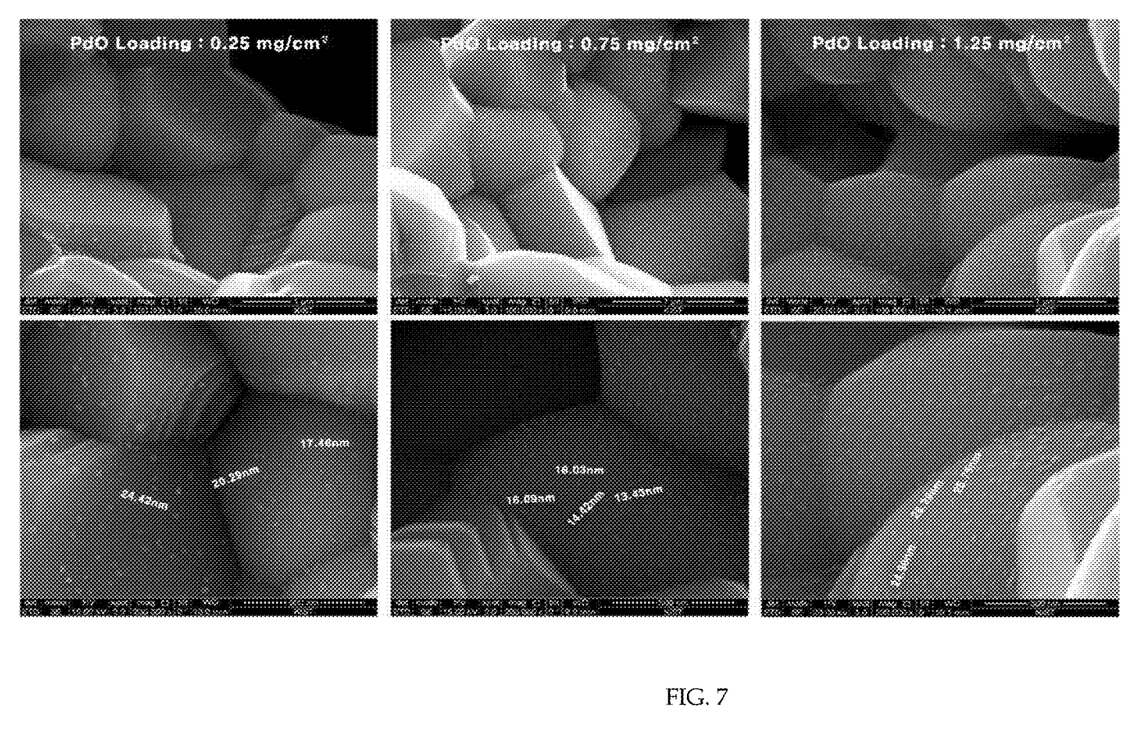
FIG. 7 shows a SEM analysis result of fuel electrodes of solid oxide electrolysis cells according to Examples 1-3.

During the procedure of preparing the solid oxide electrolysis cells according to Examples 1-3, the SEM of the fuel electrode was analyzed when the palladium oxide was formed through the step (2). The result is shown in FIG. 7. From the figure, it can be seen that the palladium oxide (PdO) is uniformly distributed on the fuel electrode (nickel oxide) in Examples 1-3.

Test Example 3

Carbon dioxide conversion rate, carbon monoxide concentration and current-voltage behavior were measured for the solid oxide electrolysis cells according to Examples 1-3.

Figure 8:
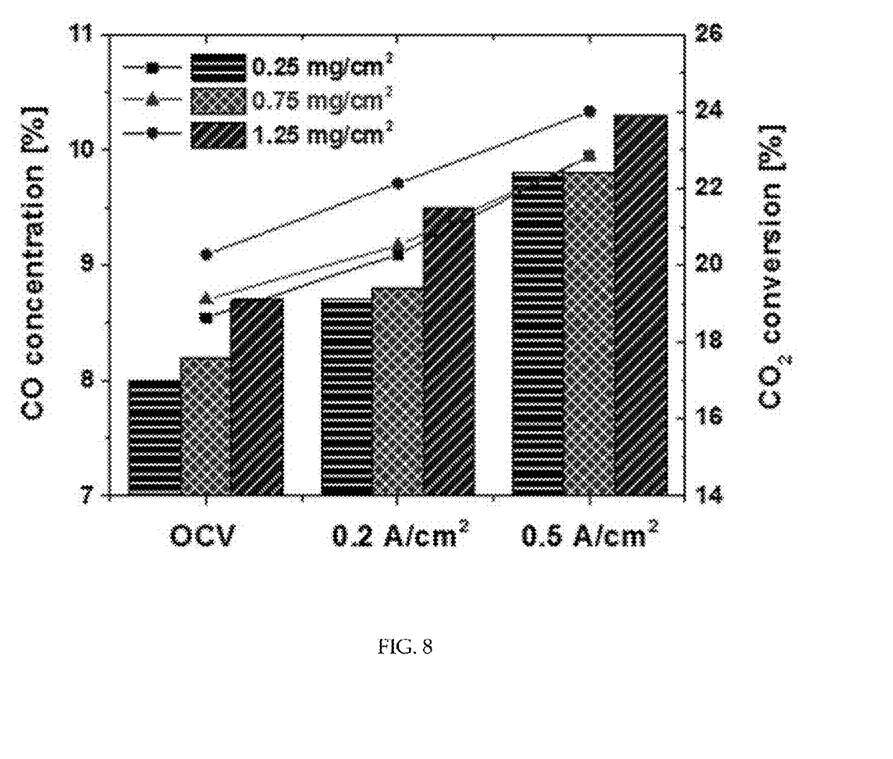
FIG. 8 shows a result of measuring the carbon dioxide conversion rate and carbon monoxide concentration in gases produced in Examples 1-3.
Figure 9:
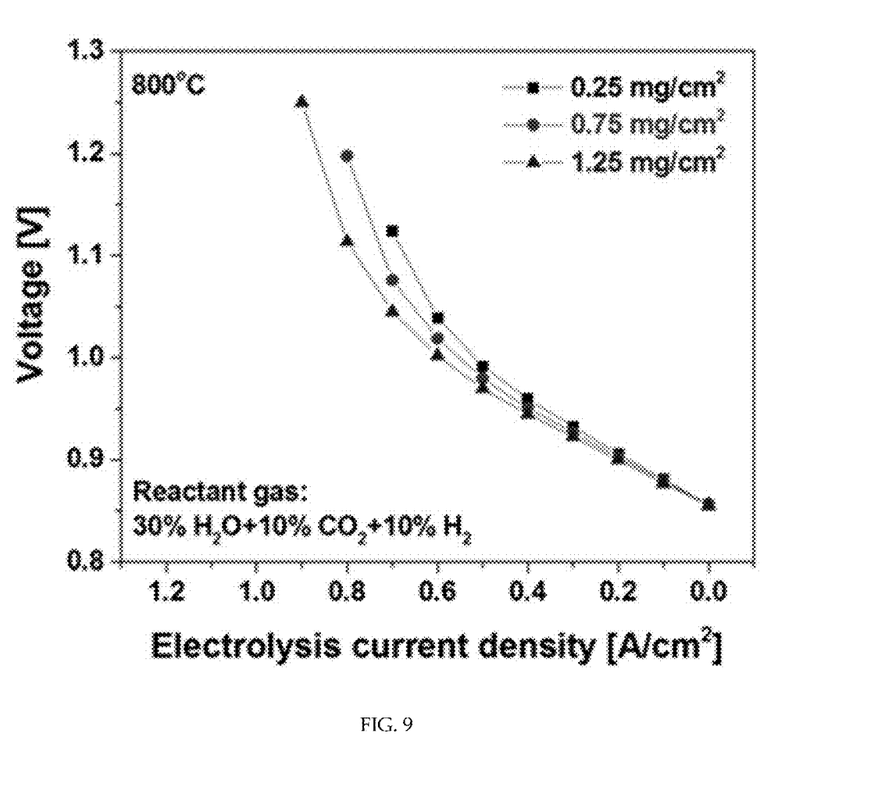
FIG. 9 shows a result of measuring the current-voltage behavior of solid oxide electrolysis cells according to Examples 1-3.

Referring to FIG. 8, it can be seen that the carbon dioxide conversion rate and the carbon monoxide concentration increase as the infiltration amount of palladium (palladium oxide) increases. And, referring to FIG. 9, it can be seen that the cell behavior is improved with increasing infiltration amount of palladium (palladium oxide) because the internal resistance of the cell decreases.

The present invention has been described in detail with reference to specific embodiments thereof. However, it will be appreciated by those skilled in the art that various changes and modifications may be made in these embodiments without departing from the principles and spirit of the invention, the scope of which is defined in the appended claims and their equivalents.

What is claimed is:

1. A method for preparing an alloy catalyst-supported fuel electrode of a solid oxide electrolysis cell, comprising:
   (1) preparing a solid oxide electrolysis cell wherein a fuel electrode containing nickel oxide (NiO), an electrolyte and an air electrode are sequentially stacked;
   (2) forming a nano-sized metal oxide on the nickel oxide contained in the fuel electrode; and
   (3) forming a nickel-metal alloy catalyst by reducing the nickel oxide and the metal oxide, wherein (2) includes:
   (2-1) mixing a metal oxide precursor, urea and a solvent;
   (2-2) infiltrating the mixture solution obtained in (2-1) into the fuel electrode;
   (2-3) forming a metal hydroxide or a metal hydroxycarbonate on a surface of the nickel oxide by heat-treating the fuel electrode that passed through (2-2); and
   (2-4) removing the solvent and forming the metal oxide on the surface of the nickel oxide by heat-treating the fuel electrode that passed through (2-3).

2. The method for preparing an alloy catalyst-supported fuel electrode of a solid oxide electrolysis cell according to claim 1, wherein (2-3) is performed at 80-100 ° C. for 2-4 hours.

3. The method for preparing an alloy catalyst-supported fuel electrode of a solid oxide electrolysis cell according to claim 1, wherein (2-4) is performed at 250-400 ° C. for 1-2 hours.

4. The method for preparing an alloy catalyst-supported fuel electrode of a solid oxide electrolysis cell according to claim 1, wherein, in (2-1), the metal oxide precursor and the urea are mixed at a molar ratio of 1:10 to 1:6.

5. The method for preparing an alloy catalyst-supported fuel electrode of a solid oxide electrolysis cell according to claim 1 wherein, in (2-1), the solvent is a mixture of ethanol with water at a volume ratio of 1:1.7 to 1:0.6.

6. The method for preparing an alloy catalyst-supported fuel electrode of a solid oxide electrolysis cell according to claim 1, wherein (2-2) through (2-4) are repeated such that the content of the metal oxide becomes 0.25-1.25 mg/cm$^2$.

7. The method for preparing an alloy catalyst-supported fuel electrode of a solid oxide electrolysis cell according to claim 1, wherein, in (3), the nickel oxide and the metal oxide are reduced by heat-treating the fuel electrode that passed through (2) at 600-900 ° C. under a hydrogen atmosphere.

8. The method for preparing an alloy catalyst-supported fuel electrode of a solid oxide electrolysis cell according to claim 1 wherein the metal of the nickel-metal alloy catalyst is selected from platinum (Pt), palladium (Pd), ruthenium (Ru), rhodium (Rh), iron (Fe), copper (Cu) or cobalt (Co).

* * * * *